US012108164B2

United States Patent
Haruse et al.

(10) Patent No.: US 12,108,164 B2
(45) Date of Patent: Oct. 1, 2024

(54) IMAGING APPARATUS

(71) Applicant: KOITO MANUFACTURING CO., LTD., Tokyo (JP)

(72) Inventors: Yuta Haruse, Shizuoka (JP); Shintaro Sugimoto, Shizuoka (JP); Teruaki Torii, Shizuoka (JP); Kento Nitta, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 68 days.

(21) Appl. No.: 17/934,777

(22) Filed: Sep. 23, 2022

(65) Prior Publication Data

US 2023/0009034 A1   Jan. 12, 2023

Related U.S. Application Data

(63) Continuation of application No. PCT/JP2021/012021, filed on Mar. 23, 2021.

(30) Foreign Application Priority Data

Mar. 26, 2020   (JP) .................................. 2020-056626

(51) Int. Cl.
*H04N 23/74* (2023.01)
*B60Q 1/00* (2006.01)
(Continued)

(52) U.S. Cl.
CPC ........... *H04N 23/74* (2023.01); *B60Q 1/0023* (2013.01); *H04N 23/56* (2023.01); *H04N 23/71* (2023.01); *B60Q 1/04* (2013.01); *G06V 20/56* (2022.01)

(58) Field of Classification Search
CPC ........ H04N 23/74; H04N 23/56; H04N 23/71; B60Q 1/0023; B60Q 1/04; B60Q 1/249;
(Continued)

(56) References Cited

U.S. PATENT DOCUMENTS

2018/0255212 A1\*   9/2018   Sprigg .................... H04N 23/81
2018/0309941 A1   10/2018   Lopez et al.
(Continued)

FOREIGN PATENT DOCUMENTS

| JP | 6412673 B1 | 10/2018 |
| JP | 2019023640 A | 2/2019 |
| WO | 2020137908 A1 | 7/2020 |

OTHER PUBLICATIONS

Ferri, et al., "Differential Ghost Imaging", ResearchGate, Physical Review Letters, Jun. 25, 2010, 5 pages.
(Continued)

*Primary Examiner* — Michael Lee
(74) *Attorney, Agent, or Firm* — BUCHANAN, INGERSOLL & ROONEY PC (57) ABSTRACT

The illumination device has a plurality of light-emitting pixels which are individually on/off controllable, and emits a reference light having a random intensity distribution. The photodetector detects light reflected from an object. The processing device reconstructs an image of the object OBJ, by calculating a correlation between a detection intensity b based on an output of the photodetector, and the intensity distribution I of the reference light. The plurality of light-emitting pixels are divided into the m (m≥2) areas each containing n (n≥2) adjoining light-emitting pixels. By selecting one light-emitting pixel from each of the m areas without overlapping, the n light-emitting pixel groups are determined. The imaging apparatus carries out sensing for every light-emitting pixel group.

6 Claims, 8 Drawing Sheets

(51) Int. Cl.
*B60Q 1/04* (2006.01)
*G06V 20/56* (2022.01)
*H04N 23/56* (2023.01)
*H04N 23/71* (2023.01)

(58) Field of Classification Search
CPC ...... G06V 20/56; G06V 10/60; G01S 7/4815; G01S 7/497; G01S 17/894; G01S 17/931
USPC ......................................................... 348/618
See application file for complete search history.

(56) References Cited

U.S. PATENT DOCUMENTS

| | | | |
|---|---|---|---|
| 2019/0025672 A1* | 1/2019 | Van Der Sijde | H04N 23/56 |
| 2019/0179143 A1* | 6/2019 | Nambara | G02B 19/0061 |
| 2020/0150276 A1 | 5/2020 | Hirota | |
| 2021/0167572 A1* | 6/2021 | Tabata | H01S 5/042 |
| 2021/0341618 A1* | 11/2021 | Gomi | G01S 7/4861 |
| 2022/0103737 A1* | 3/2022 | Mochizuki | B60Q 1/06 |
| 2022/0397675 A1* | 12/2022 | Arioua | G01S 7/4802 |

OTHER PUBLICATIONS

International Search Report (PCT/ISA/210) and Written Opinion (PCT/ISA/237) with English translations mailed on May 25, 2021, by the Japan Patent Office as the International Searching Authority for International Application No. PCT/JP2021/012021.
Tetsuno, et al., "Subpixel-shifted cyclic-Hadamard imaging using a pseudo-inverse-matrix procedure", The 77th JSAP Autumn Meeting, Sep. 1, 2016, 3 pages with English Translation.

* cited by examiner

NON-DIVISION METHOD

GI

DGI

FIG. 2C

AREA DIVISION METHOD

GI

DGI

PIX

IMAGING APPARATUS

BACKGROUND

1. Technical Field

The present disclosure relates to an imaging apparatus.

2. Description of the Related Art

An object identification system that senses position and type of an object present around a vehicle has been used for automatic driving or automatic control of light distribution of headlamp. The object identification system includes a sensor, and a processing device that analyzes output of the sensor. The sensor is selected from camera, light detection and ranging or laser imaging detection and ranging (Li-DAR), millimeter wave radar, ultrasonic sonar and so forth, in consideration of the application, required accuracy, and cost.

One known type of the imaging apparatus (sensor) relates to a device that makes use of the ghost imaging principle. In the ghost imaging, an object is illuminated with the reference light while randomly switching intensity distribution (pattern) thereof, to measure light detection intensity of the reflected light for every pattern. The light detection intensity is an integral value of energy or intensity over a certain plane, and is not intensity distribution. Correlation of the corresponding pattern with the light detection intensity is then determined, to reconstruct a restored image of the object.

The present inventors have examined the area division method described below, as a comparative technique. Note that the comparative technique is by no means recognized as a known technique.

Figure 1A:
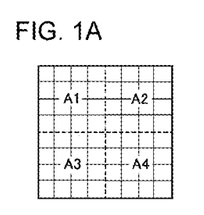
FIGS. 1A and 1B are drawings for explaining the area division method.
Figure 1B:
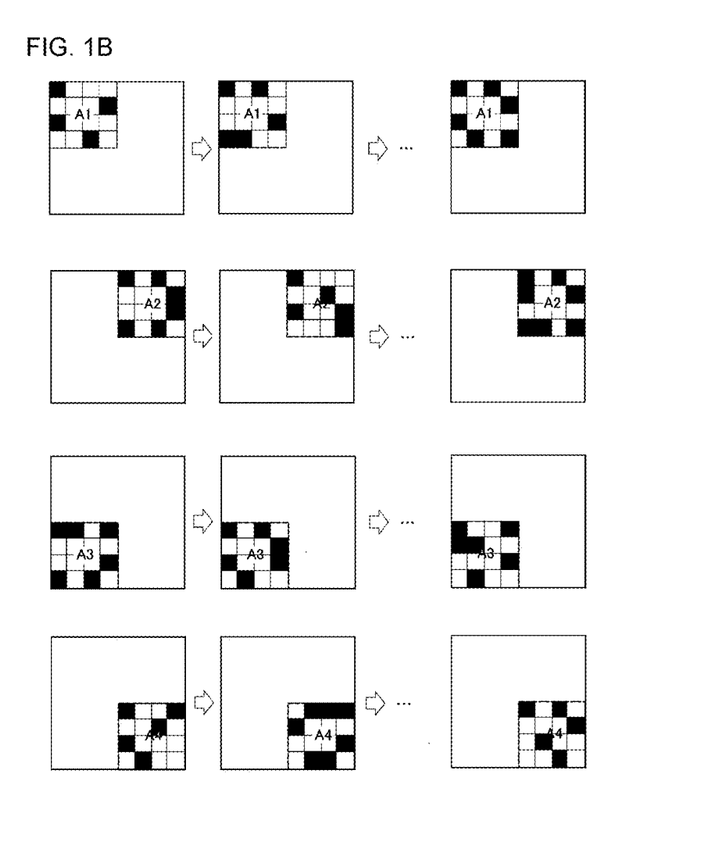

FIGS. 1A and 1B are diagrams for explaining the area division method. As illustrated in FIG. 1A, the illumination device has a plurality of light-emitting pixels that are on/off controllable. The plurality of light-emitting pixels are divided into a plurality of areas A1 to A4.

In the comparative technique, as illustrated in FIG. 1B, an object is illuminated with the reference light, while randomly changing the intensity distribution for each of the areas A1 to A4. Correlation of the output of the photodetector with the intensity distribution of the reference light is then determined for each of the plurality of areas A1 to A4, to reconstruct a restored image of a part of the object that falls in each area.

According to this comparative technique, the total amount of calculation may be reduced, as compared with a non-division method in which all pixels are used for random irradiation without being divided into areas.

Figure 2A:
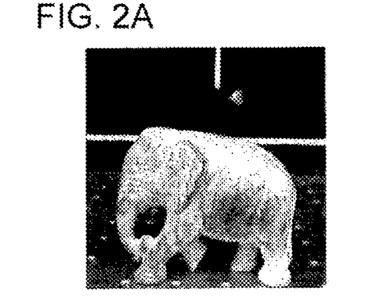
FIG. 2A is a photograph of a target used for verification.
Figure 2B:
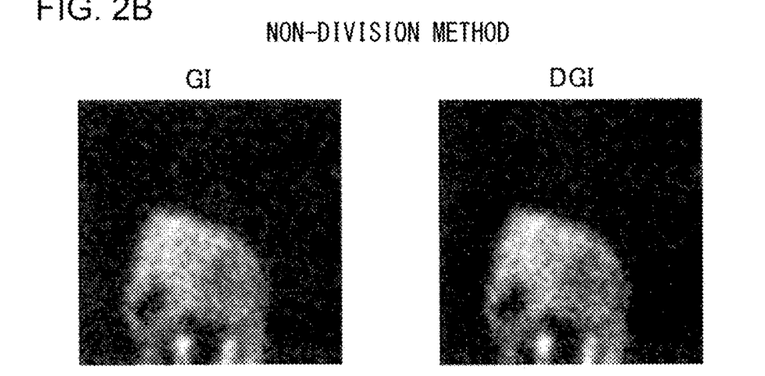
FIG. 2B is a drawing illustrating restored images obtainable by the non-division method.
Figure 2C:
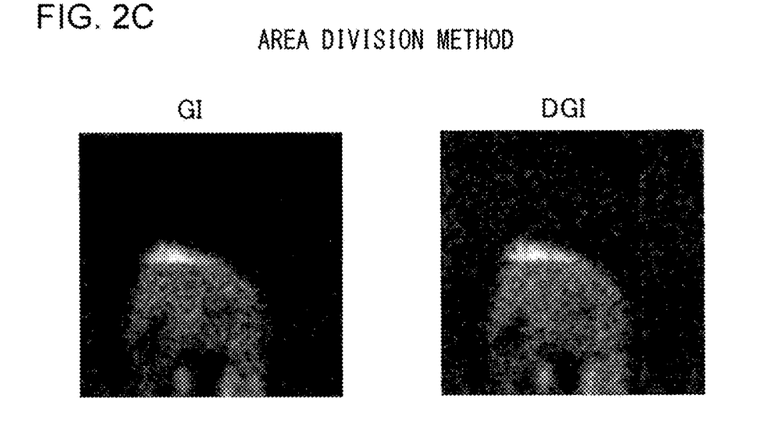
FIG. 2C is a drawing illustrating restored images obtainable by the area division method.

The present inventors experimentally verified the non-division method and the area division method. In this verification, the irradiation area is divided into four areas. FIG. 2A shows a photograph of a target to be verified, which is an elephant figurine. FIG. 2B shows a drawings illustrating restored images obtained by the non-division method, and FIG. 2C shows a drawing illustrating restored images obtained by the area division method. The verification employed a ghost imaging GI algorithm, and a differential ghost imaging DGI algorithm. The number of pixels is 64×64 pixels, with each area having 32×32 pixels.

The area division method demonstrates, as illustrated in FIG. 2C, pixel values of the restored image in the areas A2 to A4 smaller than that in the area A1 on the upper left, with clear boundaries of the areas, proving that the method is inferior to the non-division method in terms of image quality.

SUMMARY

The present disclosure has been made in such a situation, wherein an exemplary object of one aspect is to provide an imaging apparatus that suppresses the image quality from degrading, while reducing the amount of calculation.

One aspect of the present disclosure relates to an imaging apparatus. The imaging apparatus includes: an illumination device that has a plurality of light-emitting pixels which are individually on/off controllable, and emits a reference light with a random intensity distribution; a photodetector that detects reflected light from an object; and a processing device that reconstructs an image of the object, by calculating a correlation between detection intensity based on an output of the photodetector, and the intensity distribution of the reference light. The plurality of light-emitting pixels are divided into m ($m \geq 2$) areas each having n ($n \geq 2$) adjoining light-emitting pixels, wherein the n light-emitting pixel groups are determined by selecting one light-emitting pixel from each of the m areas without overlapping. The intensity distribution of the reference light is changed by on/off switching of the light-emitting pixels contained in the light-emitting pixel group, for every light-emitting pixel group. The restored image of the object is restored for every light-emitting pixel group.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later.

This summary is not an extensive overview of all possible embodiments, and is therefore not intended to identify key elements or key elements of all embodiments, or to delineate the scope of some or all aspects. The sole purpose is to present some concepts of one or more embodiments in a simplified form, as a prelude to the more detailed description presented later.

The imaging apparatus according to one embodiment includes: an illumination device that has a plurality of light-emitting pixels which are individually on/off controllable, and emits reference light having a random intensity distribution; a photodetector that detects reflected light from an object; and a processing device that reconstructs an image of the object, by calculating a correlation between detection intensity based on an output of the photodetector, and the intensity distribution of the reference light. The plurality of light-emitting pixels are divided into the m (m≥2) areas each having n (n≥2) adjoining light-emitting pixels. By selecting one light-emitting pixel from each of the m areas without overlapping, the n light-emitting pixel groups are determined. The imaging apparatus carries out sensing for every light-emitting pixel group.

According to this embodiment in which correlation calculation for reconstructing an image is carried out for every light-emitting pixel group, the amount of processing can be reduced as compared with a case where sensing is carried out with use of all pixels, and the correlation calculation is carried out collectively. Since the light-emitting pixels contained in the individual light-emitting pixel groups are distributed over the entire sensing range, so that the plurality of light detection intensity values obtainable from the n light-emitting pixel groups are leveled. Brightness of the restored image obtainable from every light-emitting pixel group may therefore be leveled, whereby image quality of the restored image may be prevented from degrading.

In one embodiment, each light-emitting pixel group may includes light-emitting pixels which reside at the same position (coordinate point) in the m areas. This can simplify switching operation of the light-emitting pixel groups. Furthermore, when synthesizing n images obtainable from the n light-emitting pixel groups into one image, the processing therefor may be simplified.

In one embodiment, each light-emitting pixel group may includes light-emitting pixels which reside at different positions in the m areas. This would level a plurality of light detection intensity values obtainable from the n light-emitting pixel groups, and would improve the image quality.

In one embodiment, the processing device may synthesize n images obtainable from the n light-emitting pixel groups, to produce one image. This makes it possible to obtain a restored image whose resolution is equivalent to that obtainable in a case where sensing was carried out with use of all pixels at a time.

Embodiments

The present invention will be explained below on the basis of preferred embodiments, referring to the attached drawings. All similar or equivalent constituents, members and processes illustrated in the individual drawings will be given same reference numerals, so as to properly avoid redundant explanations. The embodiments are merely illustrative, and are not restrictive about the invention. All features and combinations thereof described in the embodiments are not always necessarily essential to the present invention.

The phrase "intensity distribution is random" in the present specification does not mean perfect randomness, instead allowing randomness only to an extent enough for reconstructing an image in the ghost imaging. "Random" in the present specification may therefore encompass a certain degree of regularity. Also, "random" does not require complete unpredictability, instead allowing predictability or reproducibility.

Figure 3:
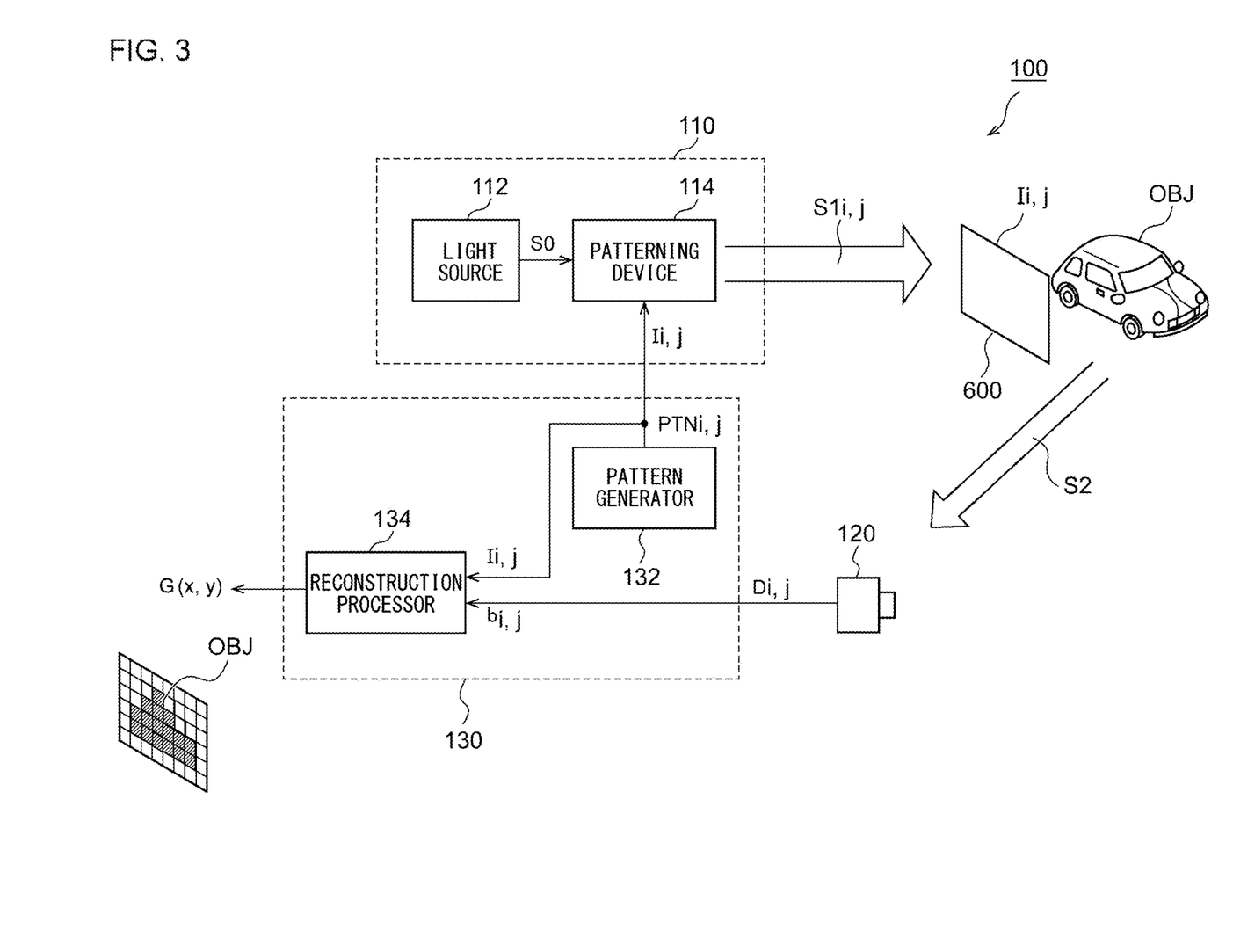
FIG. 3 is a drawing illustrating an imaging apparatus according to an embodiment.

FIG. 3 is a drawing illustrating an imaging apparatus 100 according to an embodiment. The imaging apparatus 100 is a correlation function image sensor based on the ghost imaging principle, and has an illumination device 110, a photodetector 120, and a processing device 130. The imaging apparatus 100 is also referred to as a quantum radar camera.

The illumination device 110 is a pseudo-thermal light source, which generates reference light S1 having an intensity distribution I assumable to be substantially random, and casts it on an object OBJ.

Figure 4A:
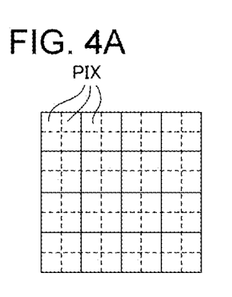
FIGS. 4A and 4B are drawings for explaining generation of reference light S1 according to the embodiment.

FIGS. 4A and 4B are drawings for explaining generation of the reference light S1 according to the embodiment. As illustrated in FIG. 4A, the illumination device 110 has a plurality of (k) light-emitting pixels PIX. The light-emitting pixel is a unit of on/off (bright/dark) control. One light-emitting pixel PIX may include a plurality of subpixels which are collectively on/off controllable. The illumination device 110 generates reference light S1 which is spatially patterned (modulated) according to on/off combinations of the light-emitting pixels PIX.

The plurality of light-emitting pixels are divided into the m (m≥2) areas each including n (n≥2) adjoining light-emitting pixels.

In this example, the illumination device 110 contains k=8×8=64 light-emitting pixels PIX, in which two adjoining light-emitting pixels PIX both in the vertical and horizontal directions, that is, n=4 light-emitting pixels PIX, constitute one area. The number m of areas is now given by k/n, which is 16.

Figure 4B:
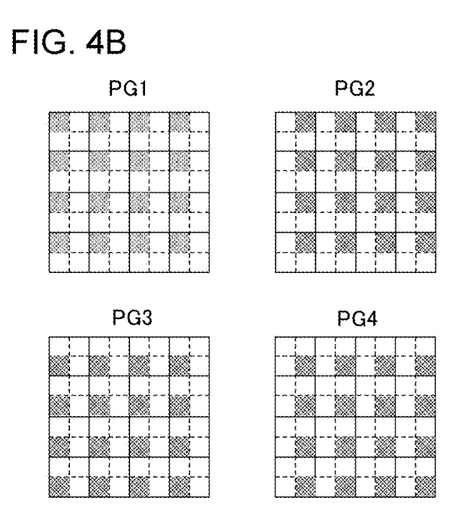

The plurality of light-emitting pixels PIX are classified into the n light-emitting pixel groups PG1 to PGn (PG1 to PG4). Each of the light-emitting pixel groups PG1 to PG4 is formed by selecting one light-emitting pixel PIX from each of the m areas without overlapping. One light-emitting pixel group eventually contains m light-emitting pixels PIX.

In this example, each light-emitting pixel group PGi (i=1 to n) contains light-emitting pixels at the same position in the m areas. The position in this context means a relative position (coordinate point) in each area. That is, the light-emitting pixel group PG1 contains the light-emitting pixels PIX on the upper left in the m areas, the light-emitting pixel group PG2 contains the light-emitting pixels PIX on the upper right in the m areas, the light-emitting pixel group PG3 contains the light-emitting pixels PIX on the lower left in the m areas, and the light-emitting pixel group PG4 contains the light-emitting pixels PIX on the lower right in the m areas.

In this embodiment, the imaging apparatus 100 carries out sensing for each of the light-emitting pixel groups PG1 to PGn.

Figure 5:
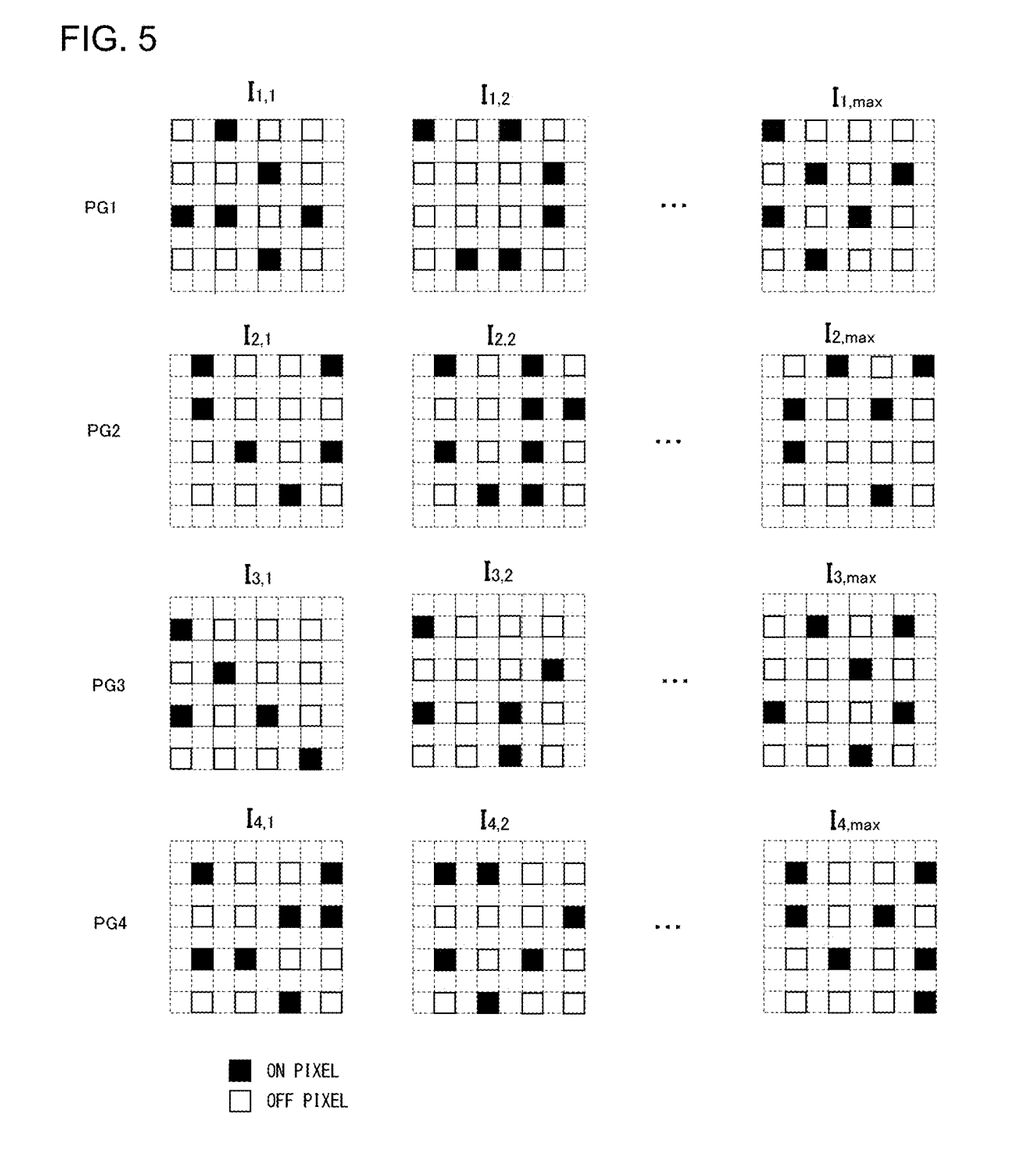
FIG. 5 is a drawing for explaining pattern control of the reference light according to the embodiment.

FIG. 5 is a drawing for explaining pattern control of the reference light according to the embodiment. Illumination is carried out maximum times, while changing the intensity distribution for each of the light-emitting pixel groups PGi (i=1 to n). The j-th intensity distribution of the i-th light-emitting pixel group PGi will be denoted by $I_{i,j}$.

Referring now to the light-emitting pixel group PGi, the reference light with the intensity distributions from $I_{i,1}$ to $I_{i,max}$ is emitted. In $I_{i,j}$, some of the m light-emitting pixels that constitute the i-th light-emitting pixel group PGi are turned ON (bright), and some of which are turned OFF (dark), thus changing the distribution of the ON pixels in a substantially random manner. The total number of times of illumination, that is, the number of patterns is given by n×max. Note that the illumination method explained with reference to FIG. 5 is referred to as the raster scanning method.

Referring now back to FIG. 3. The photodetector 120 detects reflected light from the object OBJ, and outputs a detection signal D. The detection signal $D_{i,j}$ represents a spatial integrated value of light energy (or intensity) incident on the photodetector 120, when the object OBJ is illuminated with the reference light S1 having the intensity distribution $I_{i,j}$. The photodetector 120 can therefore employ a single-pixel photodetector.

Upon illumination of the reference light $S1_{i,j}$ (i ∈ 1 to n; j ∈ 1 to max) having n×max patterns of intensity distribution $I_{1,1}$ to $I_{1,max}$, $I_{2,1}$ to $I_{2,max}$, ... $I_{n,1}$ to $I_{n,max}$ the photodetector 120 outputs n×max values of the detection signal $D_{i,j}$ (i ∈ 1 to n; j ∈ 1 to max).

The order of illumination patterns of the reference light S1 is not particularly limited. For example, illumination may follow the order, for example, of $I_{1,1}$ to $I_{1,max}$, $I_{2,1}$ to $I_{2,max}$, $I_{3,1}$ to $I_{3,max}$, $I_{n,1}$ to $I_{n,max}$. Alternatively, illumination may follow the order, for example, of $I_{1,1}$ to $I_{n,1}$, $I_{1,2}$ to $I_{n,2}$, ... $I_{1,max}$ to $I_{n,max}$.

The illumination device 110 may include, for example, a light source 112 that generates light S0 having a uniform intensity distribution, and a patterning device 114 capable of spatially modulating the intensity distribution of the light S0. The light source 112 may use a laser, a light emitting diode, or the like. Wavelength or spectrum of the reference light S1 is not particularly limited, and may be white light having a plurality of spectra or a continuous spectrum, or monochromatic light that contains a predetermined wavelength (for example, near infrared or infrared radiation).

The patterning device 114 may use a digital micromirror device (DMD) or a liquid crystal device. In this embodiment, the patterning device 114 covers an entire measurement range 600, and can illuminate the entire measurement range 600 at a time.

The patterning device 114 is given a pattern signal $PTN_{i,j}$ (image data) that designates the intensity distribution $I_{i,j}$, from the processing device 130. Hence the processing device 130 knows a position of the area currently illuminated, and the intensity distribution $I_{i,j}$ of the reference light S1.

The processing device 130 has a pattern generator 132 and a reconstruction processor 134.

The pattern generator 132 may randomly generate the intensity distribution $I_{i,j}$ of the reference light S1 each time. In this case, the pattern generator 132 may include a pseudo-random signal generator.

Alternatively, a set of intensity distribution values $I_1$ to $I_{max}$ with a common pattern may be used for the plurality of light-emitting pixel groups PG1 to PGn. For example, the set of patterns $I_{1,1}$ to $I_{1,max}$ of one light-emitting pixel group PG1 may have applied thereto a set of intensity distribution values $I_1$ to $I_{max}$ without modification, meanwhile the other light-emitting pixel groups PG2 to PGn may have applied thereto a set of intensity distribution values $I_1$ to $I_{max}$ after shifting them by several pixels in the horizontal direction and/or the vertical direction.

The processing device 130 may be implemented by a combination of a processor (hardware) such as central processing unit (CPU), micro processing unit (MPU), or microcomputer, with software program executed by the processor (hardware). The processing device 130 may be implemented by a combination of a plurality of processors. Alternatively, the processing device 130 may be structured solely by the hardware.

The reconstruction processor 134 reconstructs the image $G_i$ of the object OBJ, by correlating the plurality of detection intensity values $b_{i,1}$ to $b_{i,max}$ with the intensity distribution values $I_{i,1}$ to $I_{i,max}$ of the reference lights $S1_{i,1}$ to $S1_{i,max}$, for one PGi of the light-emitting pixel groups PG1 to PGn. Resolution of the image $G_i$ will be given by 1/n times the resolution of the illumination device 110.

The detection intensity values $b_{i,1}$ to $b_{i,max}$ are derived from the detection signals $D_{i,1}$ to $D_{i,max}$. Relationship between the detection intensity $b_{i,j}$ and the detection signal $D_{i,j}$ may be determined, typically by taking types or schemes of the photodetector 120 into consideration.

Assuming now that the reference light S1 with a certain intensity distribution $I_{i,j}$ is illuminated over a certain period of illumination. Also assuming now that the detection signal $D_{i,j}$ represents the amount of received light at a certain point in time (or microtime), that is, an instantaneous value. In this case, the detection signal $D_{i,j}$ may be sampled a plurality of times during the illumination period, so as to make the detection intensity $b_{i,j}$ represent an integral value, an average value, or a maximum value of all sampled values of the detection signal $D_{i,j}$. Alternatively, some of all sampled values may be selected, and an integral value, an average value, or a maximum value of the selected sampled values may be used. When selecting the plurality of sampled values, for example, the x-th to y-th values serially from the maximum value may be extracted; sampled values smaller than an arbitrary threshold value may be excluded; or sampled values whose signal variation falls in a small range may be extracted.

If the photodetector 120 is a device like a camera, for which the exposure time may be preset, the output $D_{i,j}$ of the photodetector 120 may be used directly as the detection intensity $b_{i,j}$.

Conversion from the detection signal $D_{i,j}$ to the detection intensity $b_{i,j}$ may be executed by the processing device 130, or may take place outside the processing device 130.

The image $G_i$ corresponded to the i-th (1≤i≤n) light-emitting pixel group PGi is restored with use of a correlation function represented by equation (1). $I_{i,j}$ represents the j-th (1≤j≤M) intensity distribution value, and $b_{i,j}$ represents the j-th detected intensity value.

$$G_i(x, y) = \frac{1}{M}\sum_{j=1}^{M}[\{b_{i,j} - \langle b_i \rangle\} \cdot I_{i,j}(x, y)] \tag{1}$$

$$\langle b_i \rangle = \frac{1}{M}\sum_{j=1}^{M}b_{i,j}$$

The processing device 130 may generate one image by combining a plurality of images $G_1$ to $G_n$, obtained for the plurality of light-emitting pixel groups PG1 to PGn. One image has high resolution, equal to the resolution of the illumination device 110.

The structure of the imaging apparatus 100 has been described. Next, the advantage will be explained.

The number of times of calculations in the imaging apparatus 100 is as follows.

Letting now the number of pixels in the entire measurement range be X×Y, and the numbers of pixels in the horizontal and vertical directions of each light-emitting pixel group be x, y. Here, X×Y=(x×y)×n.

Assuming now that one-time pattern illumination is necessary to restore one pixel, then the number of times of illumination max' necessary to restore x×y pixels will be $$max'=(x \times y).$$

Note that the actual number of times of illumination, which would be more or less than max', is approximately proportional to (x×y). The number of times of calculation per area will then be $(x \times y)^2$. The total number of time of calculation O' for all the n light-emitting pixel groups PG1 to PGn will be $$O'=n \times (x \times y)^2.$$

The number of times of calculation O by the prior method for illuminating the entire measurement range was $$O=(X \times Y)^2.$$

Since the relationship of X×Y=(x×y)×n holds, the number of times of calculation in the present embodiment may be reduced to O'/O=1/n times as compared with the prior method.

Assuming now a case with X=Y=1024. Given n=16, and given that the number of pixels of the light-emitting pixel group PG is x=y=256, then the number of times of calculation can be reduced to 1/16 times.

Reduction in the number of times of calculation means that the calculation time can be shortened with use of a processing device of the same processing speed. Alternatively, the processing will be done within the same time consumption, only with a slower (and thus less expensive) processing device.

Figure 6A:
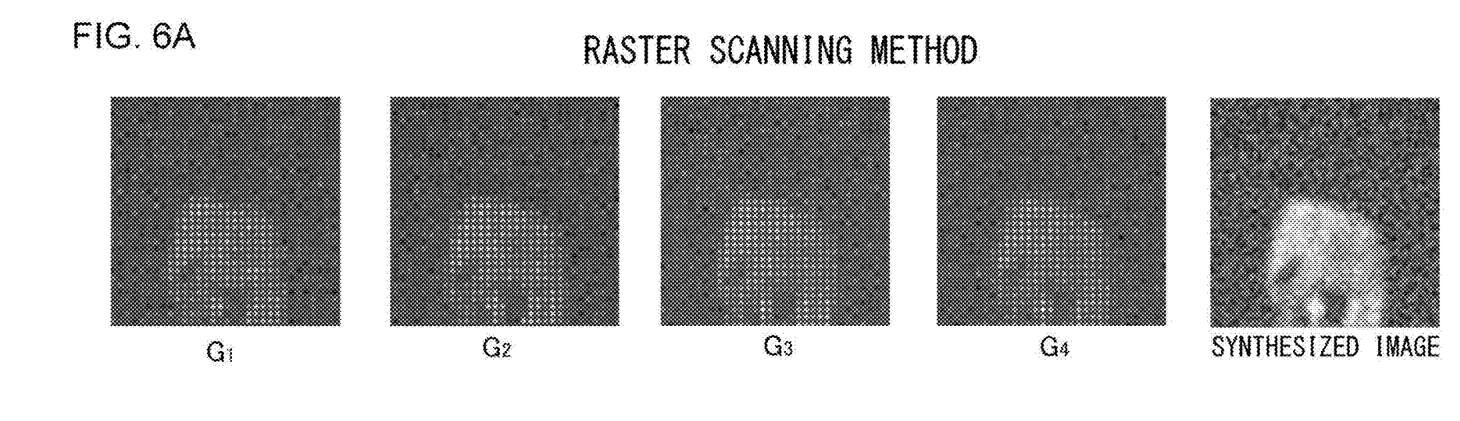
FIG. 6A is a drawing illustrating images obtainable by the raster scanning method.
Figure 6B:
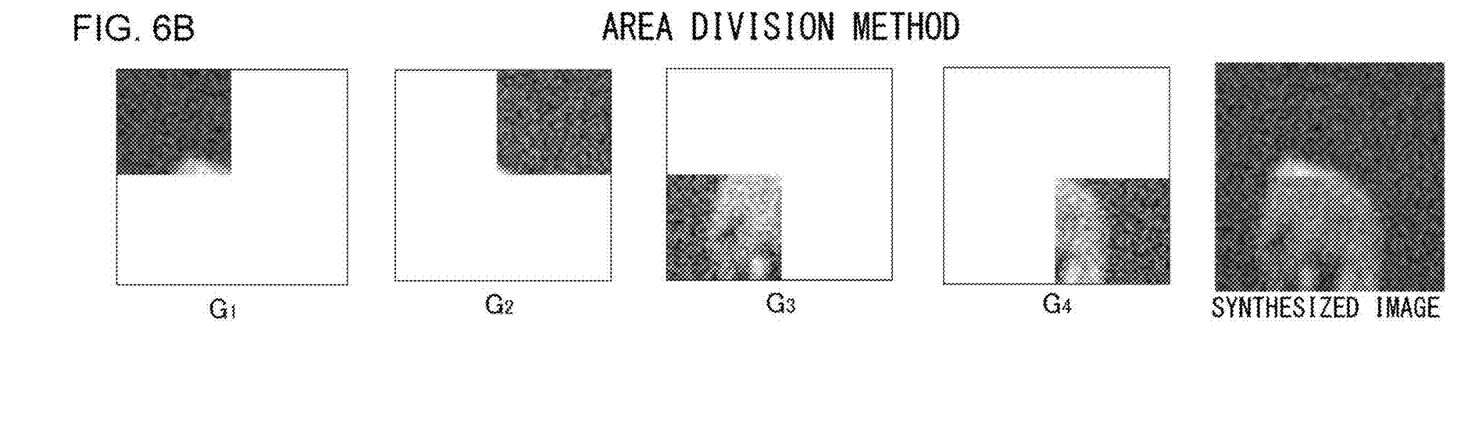
FIG. 6B is a drawing illustrating images obtainable by the area division method.

Next, further advantages of the imaging apparatus 100 will be explained. FIG. 6A is a drawing illustrating images obtainable by the raster scanning method, and FIG. 6B is a drawing illustrating images obtainable by the area division method. The verification is carried out under the same conditions as in FIGS. 2A and 2B. Each area in the area division method contains 32×32 pixels. In the raster scanning method, each of the light-emitting pixel groups PG1 to PG4 (n=4) contains 32×32 pixels. The maximum number of times of illumination per area, or per light-emitting pixel group is 10,000.

According to the area division method, as illustrated in FIG. 6B, the entire image of the object is not recognizable, unless otherwise the images in all of the areas are reconstructed. On the other hand, the raster scanning method can detect, as illustrated in FIG. 6A, a profile of the entire object with a coarse resolution, for every sensing of the light-emitting pixel groups.

Referring now back to the area division method, the brightness of the obtainable image varies from area to area, so that boundaries of the areas can be seen in the synthesized image, thus degrading the image quality. This is because the brightness of the image is affected by $<b_i>$ in equation (1). More specifically, in the upper left area, only bottom-side pixels that correspond to the head of elephant, from among 32×32 pixels, are occupied by an object, thus the object occupies only a small proportion of the pixels, causing small $<b_i>$. In contrast, in the lower left or lower right area, the proportion of the pixels that correspond to the body and legs of elephant, from among 32×32 pixels, is large, thus the object occupies a large proportion of the pixels, causing large $<b_i>$. This is the reason why the brightness varies from area to area.

In contrast, the raster scanning method levels the proportion of the number of pixels occupied by the object, for the light-emitting pixel groups PG1 to PG4. This successfully makes the light-emitting pixel groups PG1 to PG4 have similar values of $<b_i>$. The brightness of $G_1$ to $G_4$ can therefore be made uniform without causing boundaries of the areas in the synthesized image, thus improving the image quality.

Another advantage is that, in a case where each light-emitting pixel group PGi includes light-emitting pixels at the same position as illustrated in FIG. 4, there is also an advantage that processing when combining the n images $G_1$ to $G_n$ into one image can be simplified.

It is to be understood by those skilled in the art that these embodiments are merely illustrative, that the individual constituents or combinations of various processes may be modified in various ways, and that also such modifications fall within the scope of the present disclosure. Such modified examples will be explained below.

Modified Example 1

Figure 7:
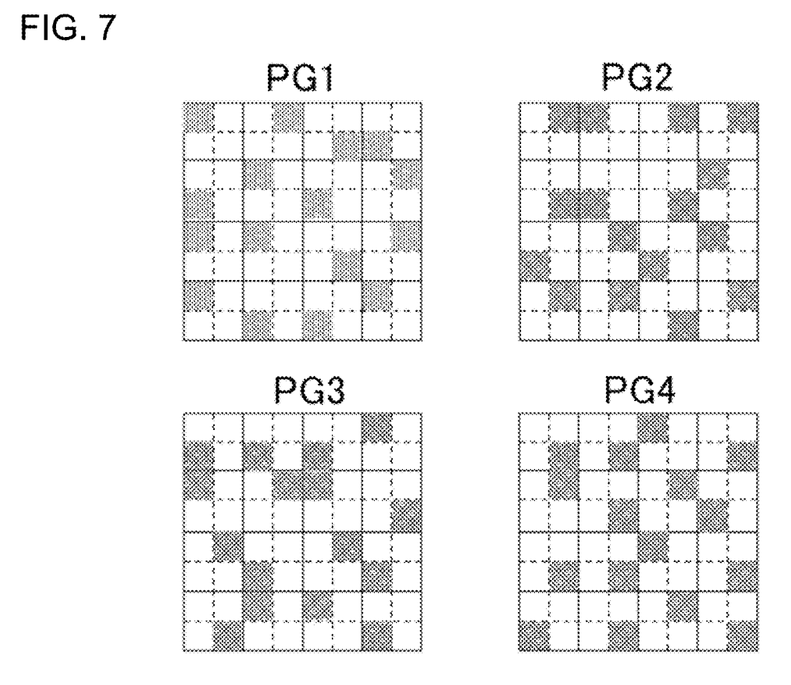
FIG. 7 is a drawing illustrating light-emitting pixel groups according to Modified Example 1.

Although FIG. 4 illustrated the plurality of light-emitting pixel groups PG1 to PG4 that contain the light-emitting pixels at the same position for all of the m areas, this is not restrictive. FIG. 7 is a drawing illustrating light-emitting pixel groups according to Modified Example 1. In Modified Example 1, each of the n light-emitting pixel groups PG1 to PGn contains the light-emitting pixels which reside at different positions in m areas. In this case, the light-emitting pixels contained in each light-emitting pixel group PGi are preferably selected so as to distribute randomly as possible. This further reduces influence of uneven positioning of the object over the light-emitting pixel groups PG1 to PGn.

Modified Example 2

A sensing device to which the present invention is applicable is not only any of those having GI as an image reconstruction algorithm, but may also be any of those having DGI or other algorithm.

Modified Example 3

The illumination device 110 in the embodiment was structured by combining the light source 112 and the patterning device 114, but not restrictively. The illumination device 110 may alternatively be structured with an array of a plurality of semiconductor light sources (light emitting diodes (LEDs) or laser diodes (LDs)) arranged in a matrix, so as to make each of the semiconductor light sources on/off (luminance) controllable.

Applications

Next, applications of the imaging apparatus 100 will be explained.

Figure 8:
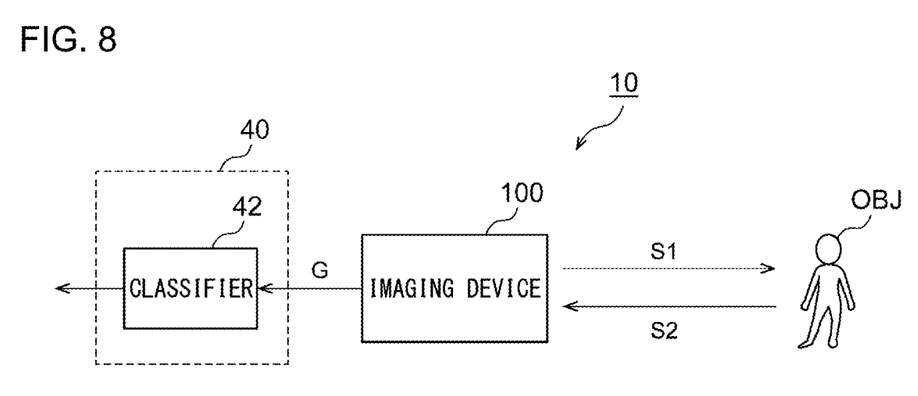
FIG. 8 is a block diagram of an object identification system.

FIG. 8 is a block diagram of an object identification system 10. The object identification system 10 is mounted on a vehicle such as an automobile or a motorcycle, and determines the type (category) of an object OBJ present around the vehicle.

The object identification system 10 includes the imaging apparatus 100 and a processing device 40. The imaging apparatus 100, as described above, illuminates the object OBJ with the reference light S1, and detects the reflected light S2, thereby generating a restored image G of the object OBJ.

The processing device 40 processes the output image G of the imaging apparatus 100, and determines the position and type (category) of the object OBJ.

A classifier 42 of the processing device 40 receives an input of the image G, and determines the position and the type of the object OBJ contained therein. The classifier 42 is implemented according to a model generated by machine learning. An algorithm of the classifier 42 adoptable herein, although not particularly limited, includes YOLO (You Only Look Once), SSD (Single Shot MultiBox Detector), R-CNN (Region-Based Convolutional Neural Network), SPPnet (Spatial Pyramid Pooling), Faster R-CNN, DSSD (Deconvolution-SSD), and Mask R-CNN, as well as any algorithm possibly developed in the future.

The structure of the object identification system 10 has been described. The following advantages are expectable from the use of the imaging apparatus 100 as a sensor of the object identification system 10.

First, the noise resistance remarkably improves, with use of the imaging apparatus 100, that is, the quantum radar camera. For example, even when the object OBJ is poorly recognizable by naked eyes during travel in rain, in snow, or in fog, use of the imaging apparatus 100 can obtain a restored image G of the object OBJ, without being affected by rain, snow, or fog.

Second, the sensing carried out for every light-emitting pixel group PG can reduce the amount of computation. This will speed-up the frame rate, and will allow choice of an inexpensive processor for the processing device.

Note that, in the imaging apparatus 100, the number n of the light-emitting pixel groups PG may be adaptively changed on the basis of the travel environment.

Figure 9:
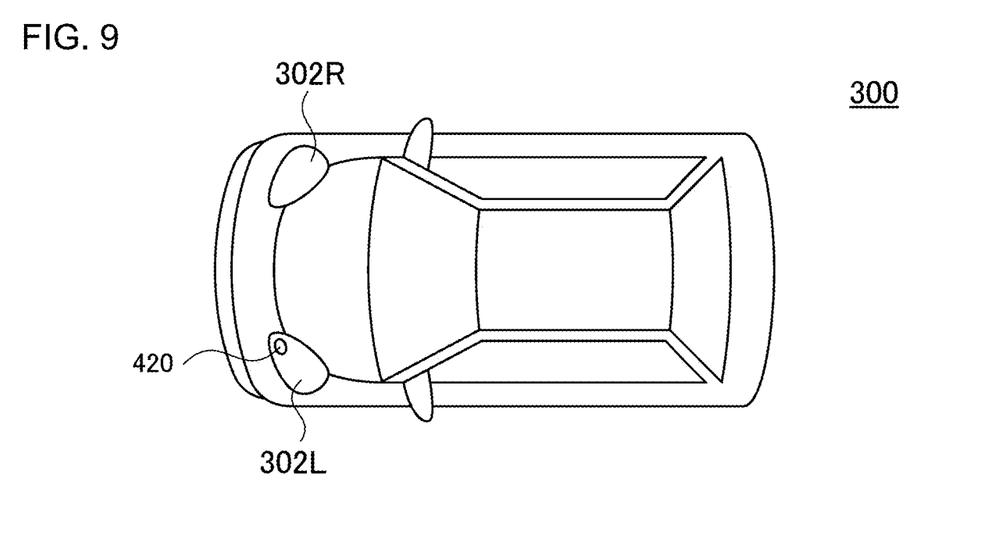
FIG. 9 is a drawing illustrating an automobile equipped with the object identification system.

FIG. 9 is a drawing illustrating an automobile equipped with the object identification system 10. The automobile 300 has headlamps 302L and 302R. The imaging apparatus 100 is built in at least either headlamp 302L or 302R. The headlamp 302 is located at the foremost position of the vehicle body, which is the most advantageous position for installation of the imaging apparatus 100 for detecting surrounding objects.

Figure 10:
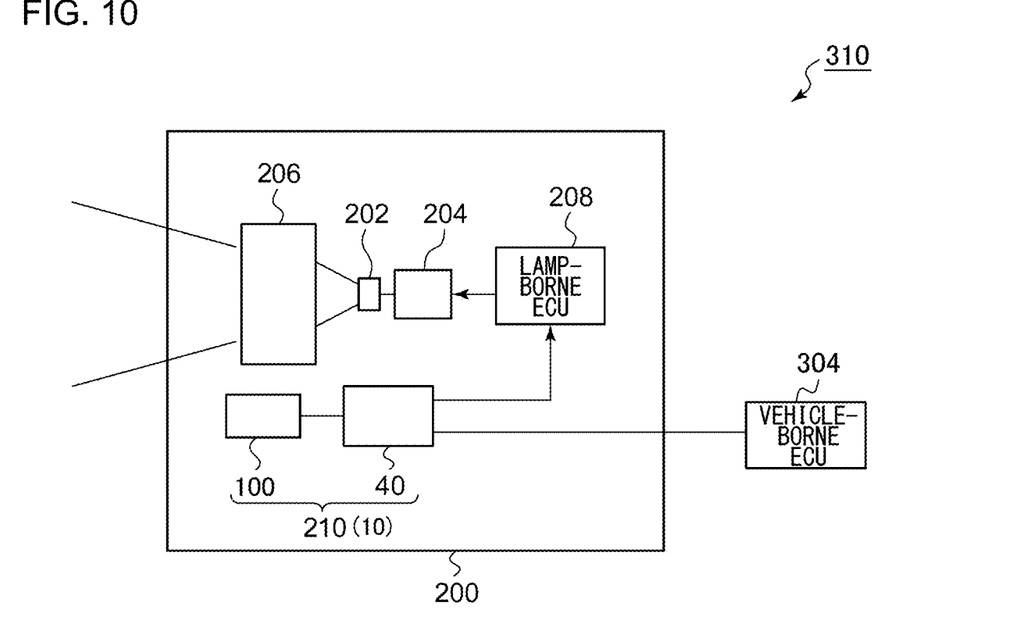
FIG. 10 is a block diagram illustrating a vehicle lamp equipped with an object detection system.

FIG. 10 is a block diagram illustrating a vehicle lamp 200 equipped with an object detection system 210. The vehicle lamp 200 constitutes a lighting system 310 together with a vehicle-borne ECU 304. The vehicle lamp 200 has a light source 202, a lighting circuit 204, and an optical system 206. The vehicle lamp 200 is further provided with the object detection system 210. The object detection system 210 corresponds to the aforementioned object identification system 10, and has the imaging apparatus 100 and the processing device 40.

Information on the object OBJ detected by the processing device 40 may be used for light distribution control of the vehicle lamp 200. More specifically, the lamp-borne ECU 208 generates an appropriate light distribution pattern, on the basis of the information on the type and position of the object OBJ, generated by the processing device 40. The lighting circuit 204 and the optical system 206 operate so as to obtain the light distribution pattern generated by the lamp-borne ECU 208.

The Information on the object OBJ detected by the processing device 40 may alternatively be sent to a vehicle-borne ECU 304. The vehicle-borne ECU may carry out automatic driving, on the basis of the information.

The embodiments merely illustrate an aspect of the principle and applications of the present invention, allowing a variety of modifications and layout changes without departing from the spirit of the present invention specified by the claims.

What is claimed is:

1. An imaging apparatus comprising:
an illumination device having a plurality of light-emitting pixels which are individually on/off controllable, and is structured to emit a reference light having a random intensity distribution;
a photodetector structured to detect reflected light from an object; and
a processing device structured to reconstruct an image of the object, by calculating a correlation between detection intensity based on an output of the photodetector, and the random intensity distribution of the reference light, wherein
the plurality of light-emitting pixels are divided into m (m≥2) areas each containing n (n≥2) adjoining light-emitting pixels, the imaging apparatus determines and n light-emitting pixel groups are formed by selecting one light-emitting pixel from each of the m areas without overlapping, and wherein
for generating an i-th (i=1, ... n) image of the object, an i-th light-emitting pixel group of the n light-emitting pixel groups is used, and the random intensity distribution of the reference light is controlled according to an on/off state of each pixel in the i-th light-emitting pixel group, and wherein
the imaging apparatus carries out sensing for every light-emitting pixel group, thereby generating n images.

2. The imaging apparatus according to claim 1, wherein the n light-emitting pixel groups contain light-emitting pixels at same positions in the m areas.

3. The imaging apparatus according to claim 1, wherein the n light-emitting pixel groups contain light-emitting pixels at different positions in the m areas.

4. The imaging apparatus according to claim 1, wherein the processing device synthesizes the n images obtained for the n light-emitting pixel groups, to generate one image.

5. A vehicle lamp comprising the imaging apparatus described in claim 1.

6. A vehicle comprising the imaging apparatus described in claim 1.

* * * * *